US009607226B2

(12) United States Patent
Zhu et al.

(10) Patent No.: US 9,607,226 B2
(45) Date of Patent: *Mar. 28, 2017

(54) METHODS AND SYSTEMS FOR OBJECT DETECTION USING MULTIPLE SENSORS

(71) Applicant: Google Inc., Mountain View, CA (US)

(72) Inventors: Jiajun Zhu, Mountain View, CA (US); Pratik Agarwal, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,725

(22) Filed: Jul. 6, 2015

(65) Prior Publication Data

US 2015/0310281 A1 Oct. 29, 2015

Related U.S. Application Data

(63) Continuation of application No. 14/262,269, filed on Apr. 25, 2014, now Pat. No. 9,098,753.

(51) Int. Cl.
*G06K 9/00* (2006.01)
*G05D 1/02* (2006.01)
(Continued)

(52) U.S. Cl.
CPC ....... *G06K 9/00791* (2013.01); *G05D 1/0246* (2013.01); *G06K 9/00805* (2013.01);
(Continued)

(58) Field of Classification Search
CPC ...... G01S 17/89; G01S 17/936; G01S 17/023; G01S 7/481; G01S 7/4817; G01S 17/58;
(Continued)

(56) References Cited

U.S. PATENT DOCUMENTS 6,169,940 B1 * 1/2001 Jitsukata .................. B62D 1/28
340/903
6,799,087 B2 9/2004 Estkowski
(Continued)

FOREIGN PATENT DOCUMENTS

DE 10 2012 024334 A1 8/2013

OTHER PUBLICATIONS

Varshney, P.K., "Multisensor Data Fusion," Electronics and Communicaton Engineering Journal, Institution of Electrical Engineers, London, GB, vol. 9, No. 6, dated Dec. 1, 1997, 10 pages.
(Continued)

*Primary Examiner* — Tom Y Lu
(74) *Attorney, Agent, or Firm* — McDonnell Boehnen Hulbert & Berghoff LLP

(57) ABSTRACT

Methods and systems for object detection using multiple sensors are described herein. In an example embodiment, a vehicle's computing device may receive sensor data frames indicative of an environment at different rates from multiple sensors. Based on a first frame from a first sensor indicative of the environment at a first time period and a portion of a first frame that corresponds to the first time period from a second sensor, the computing device may estimate parameters of objects in the vehicle's environment. The computing device may modify the parameters in response to receiving subsequent frames or subsequent portions of frame of sensor data from the sensors even if the frames arrive at the computing device out of order. The computing device may provide the parameters of the objects to systems of the vehicle for object detection and obstacle avoidance.

18 Claims, 7 Drawing Sheets

(51) Int. Cl.
  *G06T 7/20* (2017.01)
  *G06K 9/46* (2006.01)
  *G06K 9/52* (2006.01)
(52) U.S. Cl.
  CPC .............. *G06K 9/46* (2013.01); *G06K 9/52* (2013.01); *G06T 7/20* (2013.01); *G06T 7/2033* (2013.01); *G06T 2200/04* (2013.01); *G06T 2207/10016* (2013.01); *G06T 2207/10028* (2013.01); *G06T 2207/30241* (2013.01); *G06T 2207/30252* (2013.01)
(58) Field of Classification Search
  CPC ...... G01S 17/66; G01S 13/862; G01S 13/865; G01S 13/867; G01S 17/107; G01S 17/32; G01S 7/491; G01S 7/4917; G01S 13/726; G01S 13/86; G01S 13/90; G01S 13/931; G01S 15/02
  USPC .................................. 382/103, 104, 107
  See application file for complete search history.

(56) References Cited

U.S. PATENT DOCUMENTS

| | | | |
|---|---|---|---|
| 7,196,305 B2* | 3/2007 | Shaffer | B60S 1/08 250/208.1 |
| 7,725,253 B2 | 5/2010 | Foxlin | |
| 7,746,450 B2* | 6/2010 | Willner | G01S 7/491 356/28 |
| 8,086,071 B2* | 12/2011 | Chen | G06T 11/001 345/421 |
| 8,195,358 B2* | 6/2012 | Anderson | G05D 1/00 340/988 |
| 2006/0157639 A1 | 7/2006 | Shaffer | |
| 2008/0112610 A1 | 5/2008 | Israelsen | |
| 2009/0110239 A1 | 4/2009 | Chen | |
| 2010/0204974 A1 | 8/2010 | Israelsen | |
| 2011/0231016 A1 | 9/2011 | Goulding | |
| 2011/0282622 A1 | 11/2011 | Canter | |
| 2012/0308076 A1 | 12/2012 | Piekniewski | |
| 2013/0158852 A1 | 6/2013 | Stahlin et al. | |
| 2013/0226344 A1 | 8/2013 | Wong | |
| 2014/0035775 A1 | 2/2014 | Zeng et al. | |
| 2014/0232538 A1 | 8/2014 | Sobue | |

OTHER PUBLICATIONS

European Search Report issued in connection with co-pending European Patent Application No. 15165113.0, European Patent Office, dated Apr. 14, 2016, 7 pages.

* cited by examiner

METHODS AND SYSTEMS FOR OBJECT DETECTION USING MULTIPLE SENSORS

CROSS-REFERENCE TO RELATED APPLICATION

The present patent application is a continuation of U.S. patent application Ser. No. 14/262,269, filed on Apr. 25, 2014, the entire contents of which are hereby incorporated by reference.

BACKGROUND

Unless otherwise indicated herein, the materials described in this section are not prior art to the claims in this application and are not admitted to be prior art by inclusion in this section.

A vehicle may navigate a path of travel using information gathered about the environment by sensors of the vehicle. As such, a computing device of the vehicle may receive and process information provided by vehicle sensors in order to navigate paths of travel in accordance with traffic regulations and avoid obstacles. An autonomous vehicle may operate using sensors, such as lasers, sonar, RADAR, cameras, and other devices to scan and record data from surroundings of the vehicle.

SUMMARY

The present application discloses embodiments that relate to methods and systems for object detection using multiple sensors.

In one example, the present application describes a method. The method may comprise receiving, at a computing device, a first plurality of frames of sensor data indicative of an environment of a vehicle at a first frame rate. The method may also include receiving, at the computing device, a second plurality of frames of sensor data indicative of the environment of the vehicle at a second frame rate. The method further may include, based on a first frame of the first plurality of frames indicative of the environment at a first time period and a portion of a first frame of the second plurality of frames that corresponds to the first time period, determining a plurality of parameters of one or more objects in the environment of the vehicle. Additionally, the method may include, based on a subsequent frame of the first plurality of frames indicative of the environment at a second time period and at least a subsequent portion of the first frame of the second plurality of frames that corresponds to the second time period, modifying the plurality of parameters of the one or more objects and providing the modified plurality of parameters of the one or more objects to one or more systems of the vehicle.

In another example, the present application describes a non-transitory computer readable medium having stored thereon executable instructions that, upon execution by a computing device, cause the computing device to perform functions. The functions may comprise receiving a first plurality of frames of sensor data indicative of an environment of a vehicle at a first frame rate. The functions may also include receiving a second plurality of frames of sensor data indicative of the environment of the vehicle at a second frame rate. The functions further may include, based on a first frame of the first plurality of frames indicative of the environment at a first time period and a portion of a first frame of the second plurality of frames that corresponds to the first time period, determining a plurality of parameters of one or more objects in the environment of the vehicle. Additionally, the functions may include, based on a subsequent frame of the first plurality of frames indicative of the environment at a second time period and at least a subsequent portion of the first frame of the second plurality of frames that corresponds to the second time period, modifying the plurality of parameters of the one or more objects and providing the modified plurality of parameters of the one or more objects to one or more systems of the vehicle.

In still another example, the present application describes a system. The system may comprise at least one processor. The system may also comprise a memory having stored thereon executable instructions that, upon execution by the at least one processor, cause the system to perform functions comprising receiving a first plurality of frames of sensor data indicative of an environment of a vehicle at a first frame rate. The functions may also include receiving a second plurality of frames of sensor data indicative of the environment of the vehicle at a second frame rate. The functions further may include, based on a first frame of the first plurality of frames indicative of the environment at a first time period and a portion of a first frame of the second plurality of frames that corresponds to the first time period, determining a plurality of parameters of one or more objects in the environment of the vehicle. Additionally, the functions may include, based on a subsequent frame of the first plurality of frames indicative of the environment at a second time period and at least a subsequent portion of the first frame of the second plurality of frames that corresponds to the second time period, modifying the plurality of parameters of the one or more objects and providing the modified plurality of parameters of the one or more objects to one or more systems of the vehicle.

In another example, a system is provided that comprises a means for object detection using multiple sensors. The system may also comprise a means for receiving a first plurality of frames of sensor data indicative of an environment of a vehicle at a first frame rate and receiving a second plurality of frames of sensor data indicative of the environment of the vehicle at a second frame rate. The system may also comprise a means for determining a plurality of parameters of one or more objects in the environment of the vehicle based on a first frame of the first plurality of frames indicative of the environment at a first time period and a portion of a first frame of the second plurality of frames that corresponds to the first time period. Further, the system may also comprise a means for modifying the plurality of parameters of the one or more objects based on a subsequent frame of the first plurality of frames indicative of the environment at a second time period and at least a subsequent portion of the first frame of the second plurality of frames that corresponds to the second time period and a means for providing the modified plurality of parameters of the one or more objects to one or more systems of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
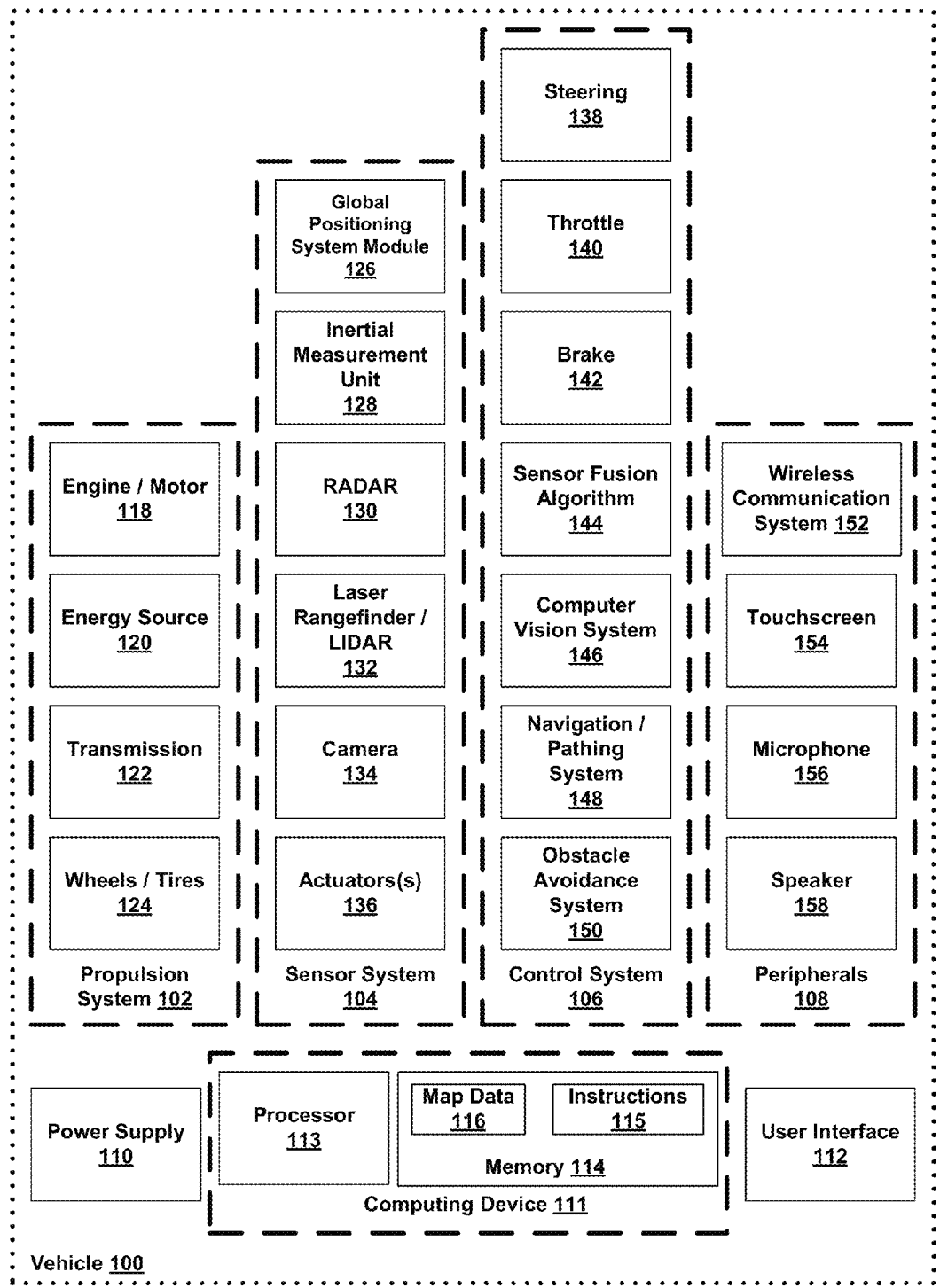
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A vehicle, such as an autonomous or driverless vehicle, may navigate a path of travel without requiring a driver to provide guidance and control. In order to ensure safe travel, obey traffic regulations, and avoid obstacles in the environment, the vehicle may utilize data provided by a vehicle sensor system equipped with one or multiple types of sensors configured to capture measurements of the vehicle's environment. In addition to the sensor system, the vehicle may also include one or multiple computing systems (i.e., a computing device) configured to process sensor data received from vehicle sensors and use the processed data along with other vehicles systems to detect objects, navigate paths, and perform other necessary actions required for safe, autonomous navigation.

During operation, the various sensors may capture measurements of the vehicle's environment and provide the sensor data in various formats at different rates to the computing device of the vehicle. For example, the computing device may receive sensor measurements in the form of sensor data frames with each frame containing one or multiple measurements of the environment at the particular times of operation by the sensor. As such, the sensor may provide multiple sensor data frames (e.g., a series of sensor data frames) to the computing device of the vehicle as the vehicle operates, which may reflect changes in the environment.

The vehicle's computing device may use incoming sensor data frames from a sensor or multiple sensors to develop a feature state that encompasses information about the environment. For example, the computing device may determine a feature state reflective of parameters (e.g., position, speed, size, acceleration) of objects in the environment as well as possible trajectories for the objects. The computing device may associate a trajectory with an object in the environment to estimate possible near-term locations of the objects relative to the vehicle. As a result, the vehicle may use its feature state, including estimated object trajectories for obstacle avoidance and navigation in general. As the vehicle operates, the computing device may continuously process newly received sensors data frames in order to determine changes in the environment and update its feature state based on the changes for use during navigation. Further, the sensor data frames may assist the computing device with recognizing and possibly categorizing objects as well clutter in the environment. In some instances, the sensor data frames may enable the computing device to determine other information as well.

However, the computing device may receive sensor data frames from multiple sensors at different rates (e.g., various latency levels). For example, the computing device may receive sensor data frames from one sensor at a high latency level and may receive sensor data frames from another sensor at a low or mid latency level. As such, prior to determining information about the environment from the multiple sensor data frames, the computing device may use a buffer to hold sensor data frames (e.g., measurements) received at a fast rate (e.g., low latency) until receiving other sensor data frames indicative of the environment at the same time provided at a slower rate (e.g., high latency) by other sensors. This may delay the computing device waiting for acquisition of all sensors data frames corresponding to the environment at the same time may prevent the computing device from completing an analysis and may further cause problems with autonomous navigation.

To overcome possible delays, the computing device may process received sensor data frames using a rollback technique or other similar strategy that may enable the computing device to more quickly and efficiently determine object detection information about the changing environment as the vehicle operates. Using a rollback technique may enable the computing device to avoid waiting and buffering for sensor measurements. In particular, the computing device may determine and update its feature state indicative of information about the environment surrounding the vehicle using newly received sensor data and roll back to prior gathered information about the environment (e.g., a prior feature state) in an older cached position when old out of order sensor measurements arrive at the computing device. Rolling back to cached information about the environment may reduce buffering latency and allow the computing device to update parameters associated with objects in the environment including possible trajectories of the objects much faster while preserving memory and computational power.

Further, the computing device may additionally process sensor data frames using one or multiple data association techniques, such as a Global Nearest Neighbor (GNN) function. The computing device may perform the data association technique individually for each sensor data frame and may update its information about the nearby environment after each respective sensor data frame time using the measurements within the sensor data frame and measurements in portions of other sensor data frames that correspond to the same period of time.

In an example embodiment, the computing device may receive sensor data frames indicative of the environment from multiple sensors of the vehicle. The computing device may determine information about the environment, including parameters of one or multiple objects, using a first sensor data frame completely received from a sensor and portions of other sensor data frames that correspond to the environment at the same time as the first sensor data frame received from other sensors. As such, the computing device may start processing and determining information about the environment using received sensor data frames and portions of sensor data frames without requiring buffering that may be required in situations when the computing device is configured to wait for the complete reception of sensor data frames at slower rates prior to processing.

Additionally, the computing device may update its information about the environment as new sensor data frames or subsequent portions of previously processed sensor data frames are received from the vehicles sensors. For example, the computing device may use a subsequent sensor data frame received from a sensor that is indicative of the environment at a subsequent time and any portions of other sensor data frames corresponding to the subsequent time including newly received portions of already partially used sensor data frames received at slower rates to modify its measurements about the environment, including identifying any changes in parameters of previously detected objects or detecting new objects. The computing device may provide the modified information indicative of the environment at the new time to systems of the vehicle to utilize during navigation.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Additionally, robotic devices may be configured to perform the methods and systems described herein. Other vehicles are possible as well.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be traveling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well.

The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, follow objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
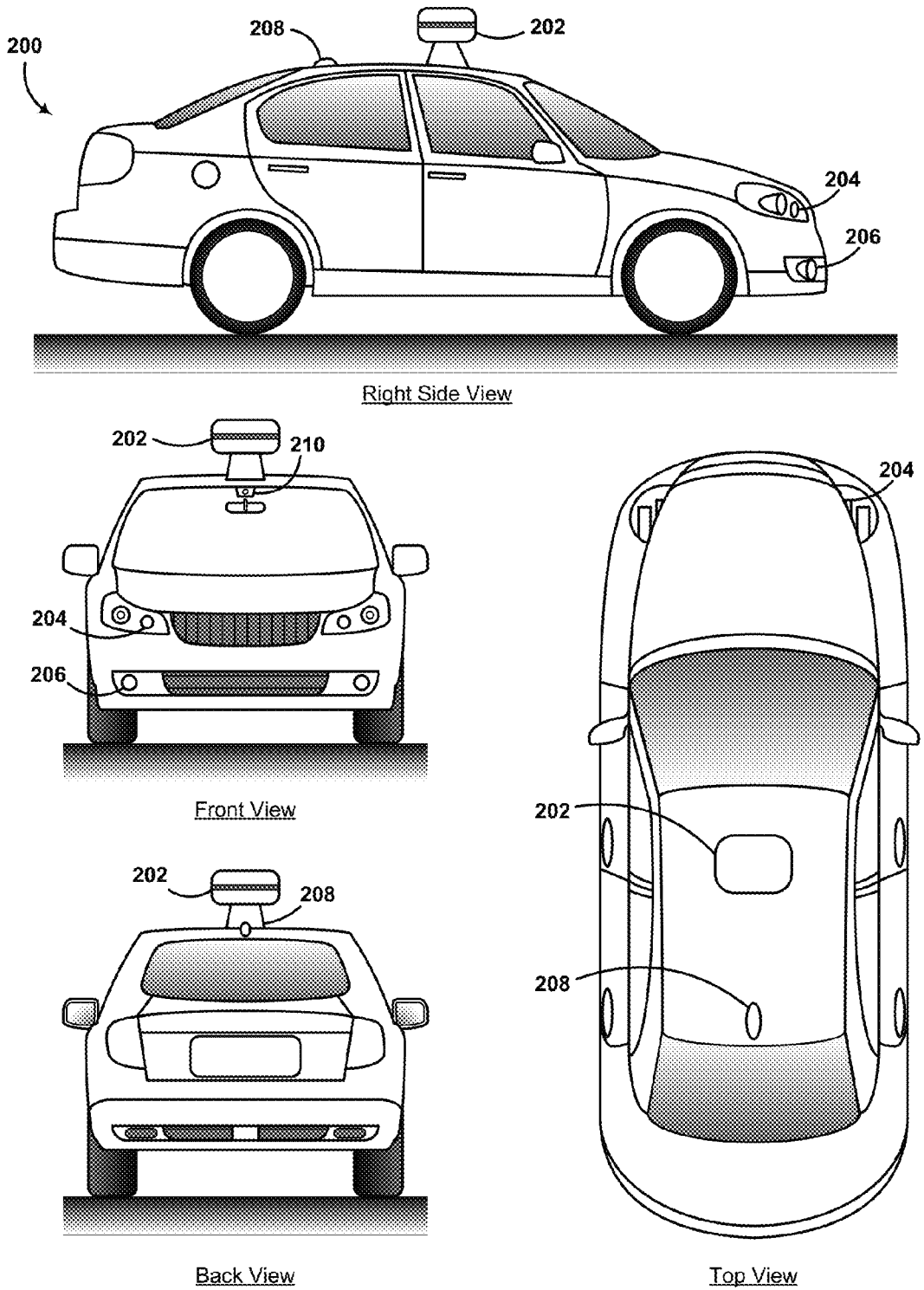
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
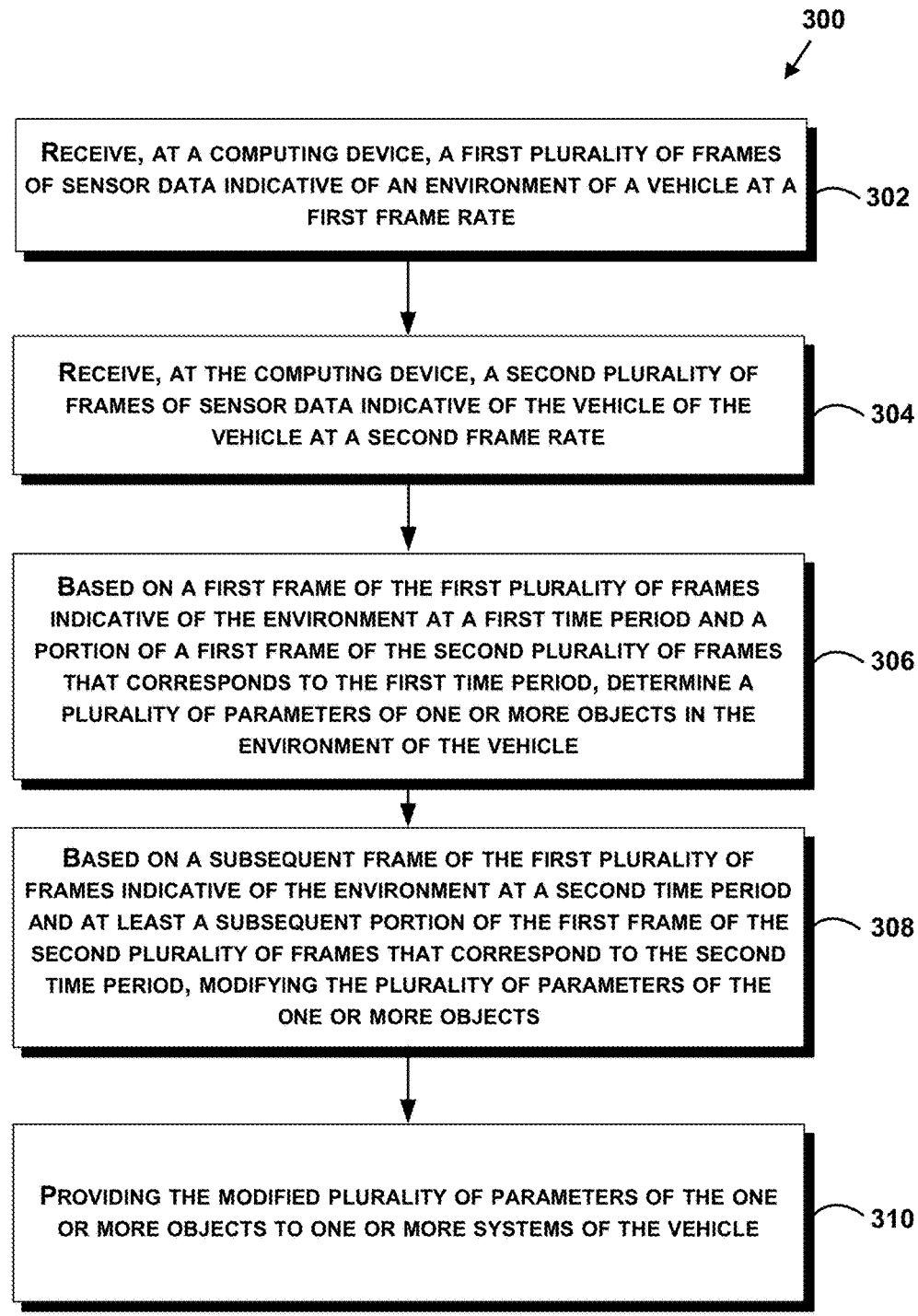
FIG. 3 is a flow chart of an example method for object detection using multiple sensors.

FIG. 3 is a flow chart of an example method 300 for methods and systems for object detection using multiple sensors. The method 300 may include one or more operations, functions, or actions as illustrated by one or more blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be a vehicle, such as the example vehicle 200 illustrated in FIG. 2. Alternatively, the computing device or system that executes some or all of the stored instructions could be another computing device or system, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. The vehicle may be autonomous, partially autonomous, or controlled completely by a user, for example. However, it should be understood that an example method may be implemented in whole or in part by other computing devices of the vehicle or separate from the vehicle. For example, an example method may be implemented in whole or in part by a server system, which receives data from a device such as those associated with the vehicle. In some example implementations, the method may be executed by a robotic device or other types of computing devices as well. Other examples of computing devices, such as robotic devices, or combinations of computing devices that can implement an example method are possible.

At block 302, the method 300 may include receiving, at a computing device, a first plurality of frames of sensor data indicative of an environment of a vehicle at a first frame rate. An example vehicle, such as the example vehicle shown in FIG. 1-2, may include as sensor system equipped with one or multiple sensors configured to capture information about the local environment surrounding the vehicle. In particular, each sensor may operate as a measuring device that may capture measurements derived from a target or targets that may enable a computing device of the vehicle to process and determine one or more characteristic properties (e.g., parameters) of the target(s). For example, the computing device may use measurements within sensor data to determine and/or estimate a location, a velocity, acceleration, a size, and/or other parameters associated with one or multiple objects in the environment. In other examples, sensor data may provide the computing device with other information about the environment.

In one example embodiment, a vehicle's sensor system may include various sensors, such as a GPS module, an IMU, a RADAR unit, a LIDAR unit, a camera system, actuators, and/or other types of sensors. The sensor system may include multiple sensors of the same types. Within other examples, a vehicle's sensor system may include more or less sensors, including other types of sensors not described herein. Additionally, the vehicle may include one or multiple computing systems (e.g., a computing device) configured to receive and process data provided by vehicle sensors. The computing systems may function together in the vehicle and may be configured to operate on different tasks with received data. As such, examples described herein may include one or multiple computing devices performing the functions described for the vehicle.

In some instances, the vehicle's computing device may perform one or multiple special measures (e.g., processing techniques) to minimize the amount or effects of measurements that do not originate from targets of interest in the environment. For example, the computing device may remove sensor data returns or individual measurements that may possibly correspond with extraneous sources, such as terrain features, sea waves, rain, ground clutter, etc. Likewise, the computing device may use appropriate dynamical thresholds on the signal strength to determine whether to utilize measurements within received sensor data frames.

Furthermore, within example implementations, a vehicle's computing device may receive sensor data in various formats and/or at different rates from the vehicles sensors. For example, a sensor may provide captured measurements of the local environment within individual sensor data frames. Each individual sensor data frame may be indicative of the environment at a particular time period when the sensor captured the measurements within the frame. As such, a sensor data frame may include one or multiple measurements of objects in the environment. For example, a LIDAR module of the vehicle may perform a sensor sweep of a certain observational area nearby the vehicle and may provide frames of sensor data containing measurements related to objects in the observational area. Other types of sensors may be configured to capture measurements based on objects in the environment and provide the measurements to the computing device of the vehicle as well. As the vehicle navigates, a sensor may be configured to provide information indicative of the environment periodically or in a continuous manner, for example.

In one example embodiment, a frame of sensor data may also include information that indicates the time of capture by the sensor of measurements and/or information that associates the frame with a particular type of sensor. For example, a computing device may receive a set of sensor data frames with each frame including information indicating a time of capture of the frame, information associating the frames with a particular sensor, and information that indicates an order of the frames within the set. In other examples, sensor data frames may include other information as well.

As previously indicated, sensor data frames may arrive at a computing device of the vehicle a particular rate (e.g., frame rate) from a sensor, which may be the result of various factors. Various sensors may provide sensor data frames at different latency levels or other frame rates. As an example, the computing device may receive sensor data frames at a low latency level from a camera system of the vehicle and may receive sensor data frames at a high latency level from LIDAR. Similarly, the frame rates at which a computing device receives sensor data frames may vary based on the type of sensor, electrical connections, the amount of data within each frame, and/or other factors.

During operation, the computing device may receive multiple sensor data frames that corresponding to a range of time during which the sensors captured the frames. As one example embodiment, the computing device may receive a set of frames of sensor data that includes a series of sensor data frames over a time period as the vehicle navigates from a sensor. Within the set, the initial (i.e., first) frame may include sensor data that corresponds to the environment at a first time period. Similarly, the second frame of the set may include sensor data that corresponds to the environment at a subsequent time period after the first time period. The consecutive frames of sensor data may provide matching or similar information about the environment or may include other information depending on the amount of time that passes between the capture of the frames by the sensor. Thus, the computing device may receive measurements and other information based on previously detected objects or new objects as the vehicle continues to operate.

At block 304, the method 300 may include receiving, at the computing device, a second plurality of frames of sensor data indicative of the environment of the vehicle at a second frame rate. As indicated above, the vehicle's computing device may receive frames of sensor data from multiple sensors. As such, each sensor may provide sensor data frames at different frame rates to the computing device, which may be the result of various factors. For example, the computing device may receive sensor data frames from multiple sensors at different latency levels.

During operation, the multiple sensors may capture measurements and other information that corresponds to the same objects in the environment, but the information may vary depending on the type and/or position of the particular sensors. For example, a camera system of the vehicle may provide images to the computing device and LIDAR may provide data points in the form of point clouds to the computing device. The computing device may receive the measurements from the camera system and the LIDAR module in a frame format, but may receive the individual sensor data frames at different rates from the sensors due to various factors, such as the variation in operation or the density of measurement data, for example. Other factors may impact the rate that the computing device receives the sensor data frames from particular sensors.

Additionally, the computing device may associate frames of sensor data with a given set of frames that corresponds to the particular sensor or type of sensor that may have provided the frames. As one example implementation, the computing device may receive consecutive sensor data frames from a LIDAR module of the vehicle at a first frame rate (e.g., a low latency level) and may receive another series of sensor data frames from a camera system of the vehicle at a different frame rate (e.g., a high latency level). Likewise, the computing device may receive additional sensor data frames from one another or multiple other sensors as well.

As such, sensors may provide frames of sensor data that correspond to the environment at the same time period, but the computing device may receive the frames at different rates. The computing device may receive multiple sensor data frames from one type of sensor prior to completing the reception of a sensor data frame from another sensor despite the sensor data frames containing measurements indicative of the environment at the same time.

At block 306, the method 300 may include, based on a first frame of the first plurality of frames indicative of the environment at a first time period and a portion of a first frame of the second plurality of frames that corresponds to the first time period, determining a plurality of parameters of one or more objects in the environment of the vehicle. As the computing device receives sensor data frames from multiple sensors, the computing device may process the data and measurements within them to determine and/or estimate features of the environment. For example, the computing device may use the captured measurements to estimate parameters of one or multiple objects in the environment. As such, example object parameters may include the computing device estimating a size, speed, position, acceleration, and/or other information indicative of an object or multiple objects in the environment. Further, the computing device may use measurements within sensor data to estimate spacing between objects in the environment and/or distances between objects and the vehicle, for example. The computing device may determine other information about the environment and/or objects within the environment based on measurements within frames of sensor data as well.

Furthermore, the computing device may use measurements and other information received from sensors to determine and/or estimate possible trajectories for one or multiple objects in the local environment of the vehicle. The estimated trajectories may represent predictions by the computing device for possible near term positions of various objects in the environment based on the measurements provided within the sensor data. The computing device may use estimated object trajectories for obstacle avoidance and/or other navigational purposes.

During operation, the computing device may use consecutive sensor data frames to determine possible trajectories for multiple objects in the environment over a period of time. The computing device may estimate the possible trajectories and changes in the trajectories for objects based on changes in the speed, size, and position of the objects relative to the vehicle of the computing device. The computing device may use other factors to determine possible trajectories of objects as well.

In an example embodiment, the computing device may determine a feature state that includes information about the vehicle's environment, which may include object detection information (e.g., parameters of the objects) and/or as estimated object trajectories. The computing device may update information within the feature state to reflect changes in the environment as the vehicle navigates. For example, the computing device may modify the feature state to reflect any changes in object parameters and/or as adding, changing, or subtracting the estimated object trajectories. As such, the computing device may provide the feature state or a portion of the information within the feature state to systems of the vehicle to enable autonomous navigation that conforms to traffic regulations. Additionally, the computing device may use the feature state for object recognition or other information as the vehicle operates.

As previously indicated, the vehicle's computing device may receive the sensor data frames from multiple sensors at different frame rates. For example, the computing device may receive sensor data frames from LIDAR at a first rate, sensor data frames from cameras at a second rate, and sensor data frames from RADAR at a third rate. The LIDAR may provide sensor data frames at a faster or slower rate than other sensors to the computing device of the vehicle. In some instances, the different frames rates may represent the various latency levels that the computing device may receive sensor data frames from respective sensors. Thus, the computing device may receive a sensor data frame indicative of the environment at a particular time prior to receiving other sensor data frames indicative of the same period from other sensors.

In one example embodiment, to overcome possible delays and/or unwanted buffering that may arise from receiving sensor data frames from multiple sensors, the computing device may use a rollback technique to process the sensor frames data received at different rates. In particular, the computing device may determine and/or update information within the feature state based on the newest sensor data received within a sensor data frame or frames. For example, the computing device may determine or update parameters for new or previously detected objects in the environment as well determining new or changes to possible object trajectories. In the case of initial operation of the vehicle, the computing device may develop a feature state based on the first sensor data frames received.

While operating, upon receiving a sensor data frame at a slower frame rate (e.g., high latency level) than other frames, the computing device may rollback the feature state to an older cached position (e.g., feature state stored in memory).

A computing device of the vehicle may use a rollback technique to use all possible sensor data as soon as the computing device receives the data. The computing device may use new sensor data after receiving it and rollback when older measurements arrive at the computing device. In one example implementation, the computing device may perform the rollback technique by changing the feature state indicative of objects in the environment to an older position (e.g., cached position), which may result in better data association as more sensor frames become available to the computing device. In some instances, the computing device may be configured to use sensor data as soon as sensor data frames are received resulting in a precise object property calculation.

Thus, the computing device may avoid buffering and use the older, cached feature state and/or a newer feature state to configure information about the environment for use by the computing device and other vehicle systems, which may include determining and/or updating estimated object trajectories. In some examples, the computing device may use the rollback technique to reduce buffer latency and/or to quickly update information within the feature state, such as the estimated trajectories for objects without using excessive computing power and memory.

In another embodiment, the computing device may buffer measurements received within sensor data frames before updating its information indicative of properties of objects. The computing device may update the object properties at a slower rate due to the buffering.

In an additional embodiment, the computing device may be configured to drop or otherwise not use data received in sensor data frames at a high latency level. The computing device may avoid buffering or using the rollback technique by dropping delayed sensor data measurements, but this may also cause the computing device to determine information indicative of parameters of the objects less accurately than when the computing device utilizes the rollback technique.

In some example embodiments, the vehicle's computing device may process received sensor data frames using a data correlation technique prior to determining a feature state indicative of the environment, including estimating the parameters and/or trajectories of objects within the nearby environment. The computing device may perform one or multiple data correlation techniques on sensor data frames in addition to using a rollback technique within incoming sensor data frames.

In one example embodiment, the computing device may execute a data correlation process that involves performing a gating function and/or data association as sensor data frames are received from sensors. The computing device may use a probabilistic gating function as a basic test to eliminate measurements that may likely not be associated with objects of interest within the local environment. The eliminated measurements may correspond to clutter in the environment or false alarms, for example. As such, the computing device may need to process the sensor frames to avoid using wrong measurements to develop and update the feature state reflecting parameters and/or trajectories of local objects.

When performing the gating function (e.g., probabilistic version), the computing device may associate a conceptual gate around a predicted position of respective object within the information of the feature state. Some measurements within received sensor frames that satisfy the gating relationship may fall within the gate and may be considered by the computing device for object parameter analysis, including trajectory estimation and filtering. In operation, the computing device may associate multiple conceptual gates with different objects in the environment and may use the gating process to reduce computations that may be required overall. Additionally, the computing device may use conceptual gates to illustrate estimated trajectories for objects within the feature state information.

Additionally, the computing device may also process sensor data frames using a data association function. As an example of executing data association, the computing device may partition incoming measurements within the sensor data frames into different sets of measurements related by the same source (e.g., same sensor). The computing device may perform data association for a sensor data frame using various algorithms or techniques, such as Global Nearest Neighbor (GNN) process, for example. The computing device may use a GNN process to process one sensor data frame at a time, which may involve finding the most probably hypothesis that is consistent with the measurements of the entire sensor data frame. The GNN process may include the computing device computing a data association for each object in a given sensor data frame such that the total cost may be minimal. The computing device may compute the minimal cost using a Hungarian method or similar methods, for example. The Hungarian method may function as a combinatorial optimization algorithm, which may solve assignment problems of assigning objects to respective predicted trajectories.

Likewise, the computing device may use a Nearest Neighbor (NN) process to associate measurements with particular objects. For example, the computing device may compare each object to previously estimated trajectories and select a particular trajectory based on the comparisons. The computing device may use the NN process to compute the data association of respective sensor data frames by finding the most probably hypothesis of measurements of a partial sensor data frame without considering the full sensor frame of data. A NN process may include computing the Mahanalobis distance of an object according to measurements in a sensor data frame compared to all existing object trajectories and as a result, select an object trajectory with the lowest cost. The Mahanalobis distance may exist as a descriptive statistic that provides a relative measure of a data point's distance (residual) from a common point.

In some example embodiments, the computing device may use a GNN process to compute a matrix of Mahanalobis distances between all existing trajectories and all objects in the sensor data frames. Using this computation, the computing device may find data association for respective objects in the sensor data frame's measurements in a manner that minimizes total cost. The computing device may use various methods for assigning objects to existing trajectories, such as the Hungarian method. The computing device may use GNN to match measurements of objects in received sensor data frames to existing trajectories previously predicted by the computing device. The computing device may update estimated trajectories using the results of the GNN or similar processes. Unlike the NN process, the GNN process may assist the computing device in refraining from erroneously associating multiple objects from a single sensor data frame to a single estimated object trajectory, which would result in an inaccurate estimated trajectory for at least one object.

Furthermore, the computing device may associate measurements within sensor data frames that correspond to the environment at the same period of time, which may require performing data association for all measurements within individual sensor data frames. The computing device may use the results of data association to estimate the parameters of objects in the vehicle's environment and/or determine object trajectories. For example, the computing device may estimate the parameters of objects and/or trajectories based on frames or portions of frames that correspond to environment at the same time period. In one example embodiment, after performing data association and/or other techniques (e.g., gating function), the computing device may use the roll back process to associate frames of sensor data or portions of frames with the time period of capture by the multiple sensors to extract measurements to determine its feature state based on the environment. In some instances, the data association may involve the computing device computing a Mahanalobis distance between detected objects within data provided by sensor data frames and estimated trajectories. The computing device may match objects with the lowest Mahanalobis distance with a particular trajectory due to having the highest probability of association.

In one example embodiment, the computing device may estimate parameters of objects or possible trajectories based on a sensor data frame indicative of the environment at a given time period received from one sensor and a portion of one or multiple sensor data frames from other sensors that corresponds to the given time period. As such, the computing device may select a first frame from a sensor that is received at the shortest frame rate (e.g., low latency) relative to other frames indicative of the environment at the same period of the first frame. Within other examples, the computing device may use other techniques or processes to process sensor data frames received from multiple sensors to estimate parameters of objects in the environment and/or possible trajectories for one or multiple objects in the environment.

In another example, the computing device may estimate parameters of objects in response to receiving a first frame from a particular sensor and may adjust or further estimate parameters of objects in response to receiving additional sensor data frames from other sensors or the same sensor. Similarly, the computing device may estimate trajectories for objects and refine the trajectories as the computing device receives new measurements as sensor data frames are received.

At block 308, the method 300 may further include, based on a subsequent frame of the first plurality of frames indicative of the environment at a second time period and at least a subsequent portion of the first frame of the second plurality of frames that corresponds to the second time period, modifying the plurality of parameters of the one or more objects. As the vehicle operates, the computing device may receive additional sensor data frames. The computing device may use the new measurements to determine changes within the environment, including any changes in the previously detected objects or detecting new objects. In that manner, the computing device may assist the vehicle operate based on changes in the environment during navigation.

As an example illustration of operation, the computing device may start receiving two frames of sensor data from two sensors at the same time, but may receive one at a much slower rate. Thus, the computing device may complete the reception of the sensor data frame being received at the slower rate at a later time than the reception of the other sensor data frame. Similar to the rollback technique described above for initial frames of sensor data, the computing device may continue to use the roll back technique described herein to associate sensor data frames and portions of sensor data frames that are indicative of the environment at the same period of time. That way, the computing device may align sensor data indicative of the environment despite receiving the frames containing the sensor data at different frame rates (e.g., different latencies).

As a result of determining changes based on subsequent sensor data frames, the computing device may modify previously determined parameters of objects in the environment or trajectories previously determined. Using new measurements within sensor data frames, the computing device may be configured to update its feature state indicative of the environment, which may include determining changes in parameters of objects or parameters of new objects in the environment based on the additional sensor data provided in subsequent frames received from sensors. For example, the computing device may estimate new parameters for newly detected objects in the local environment or update parameters previously determined for one or multiple objects. Further, the computing device may also estimate new possible trajectories for one or multiple objects in the environment as well as change or remove previously estimated trajectories for objects based on the measurements provided within subsequently received sensor data frames.

As such, the computing device may continuously update object detection information about the local environment, which may include detecting new objects and estimating new trajectories as the vehicle changes position, speed, and/or orientation in the environment. Within other examples, the computing device may determine other updates or modifications based on newly received sensor data frames provided by vehicle sensors.

In one example embodiment, the computing device may modify its feature state information based on a subsequent sensor data frame indicative of the environment at a subsequent period and at least a subsequent portion of a sensor data frame received at a slower frame rate (e.g., high latency level) that corresponds to the subsequent time period. As such, the computing device may roll back measurements received in sensor data frames received at a slower rate than other sensor data frames received at a faster rate. The computing device may update parameters of objects and/or estimated trajectories as measurements are received in sensor data frames. In some instances, the computing device may update the information indicative of the environment (e.g., feature state) using old measurements recently received in a sensor data frame despite the measurements arriving at the computing device out of the order based on the time of capture by the sensors. The computing device may fuse new and old measurements of sensor data frames as the computing device receives the frames to determine information indicative of objects and other elements of the environment.

Furthermore, the computing device may use the gating function (e.g., probabilistic gating) and data association process previously discussed with subsequent sensor data frames and portions of sensor data frames. For example, the computing device may perform data analysis on newly received sensor data frames and using the results of data analysis of that sensor data frame as well as data analysis associated with any portions of sensor data frames that correspond to the environment at the same time period to modify information within its feature state, which may include updating or adjusting object parameters and/or object trajectories. The computing device may use additional portions of received sensor data frames that correspond to the environment at a particular time as well to update its feature state.

At block 310, the method 300 may also include providing the modified plurality of parameters of the one or more objects to one or more systems of the vehicle. The computing device of the vehicle may provide information, including parameters of the objects in the environment, to systems of the vehicle for obstacle avoidance and object recognition. For example, the computing device may provide the information about the objects to the control system, which may execute functions with various units based on the parameters. As such, the control system may alter steering, the throttle, brakes, navigation system, obstacle avoidance system, and/or other systems based on the information provided by the computing device of the vehicle.

Furthermore, the computing device may be configured to provide the parameters associated with detected objects in a continuous manner, which may enable the vehicle to navigate safely in real-time. In such an example, the computing device may provide information indicative of changes in the parameters of objects located nearby the vehicle. The computing device may provide instructions to the various systems of the vehicle based on the parameters of the objects.

As one example implementation, the computing device may initially associate sensor data frames from multiple sensors based on different factors prior to determining information about the environment using the sensor measurements. For example, the computing device may associate sensor data frames with other sensor data frames received from the same particular sensor. Likewise, the computing device may associate sensor data frames with other sensor data frames indicative of the environment at the same time period, which may involve the computing device associating sensor data frames from multiple sensors based on the period of capture by the sensors. In other examples, the computing device may associate sensor data frames based on other factors.

In a further example embodiment, the computing device may fuse all sensor measurements as soon as the measurements arrive in sensor data frames at the computing device to determine its feature state and estimate trajectories for the objects in the environment. For example, the computing device may estimate the parameters of various objects in the environment continuously as the computing device receives the various sensor data frames from sensors. Upon receiving each sensor data frame, the computing device may use measurements from the respective sensor data frame to estimate parameters of the environment and/or estimate possible object trajectories despite receiving some measurements in sensor data frames out of order according to time of capture by the sensors. The computing device may provide the various parameters (e.g., properties) of the objects to other vehicles, systems of the vehicle, or other entities for use. For example, the vehicle systems may use the parameters for obstacle avoidance.

Figure 4:
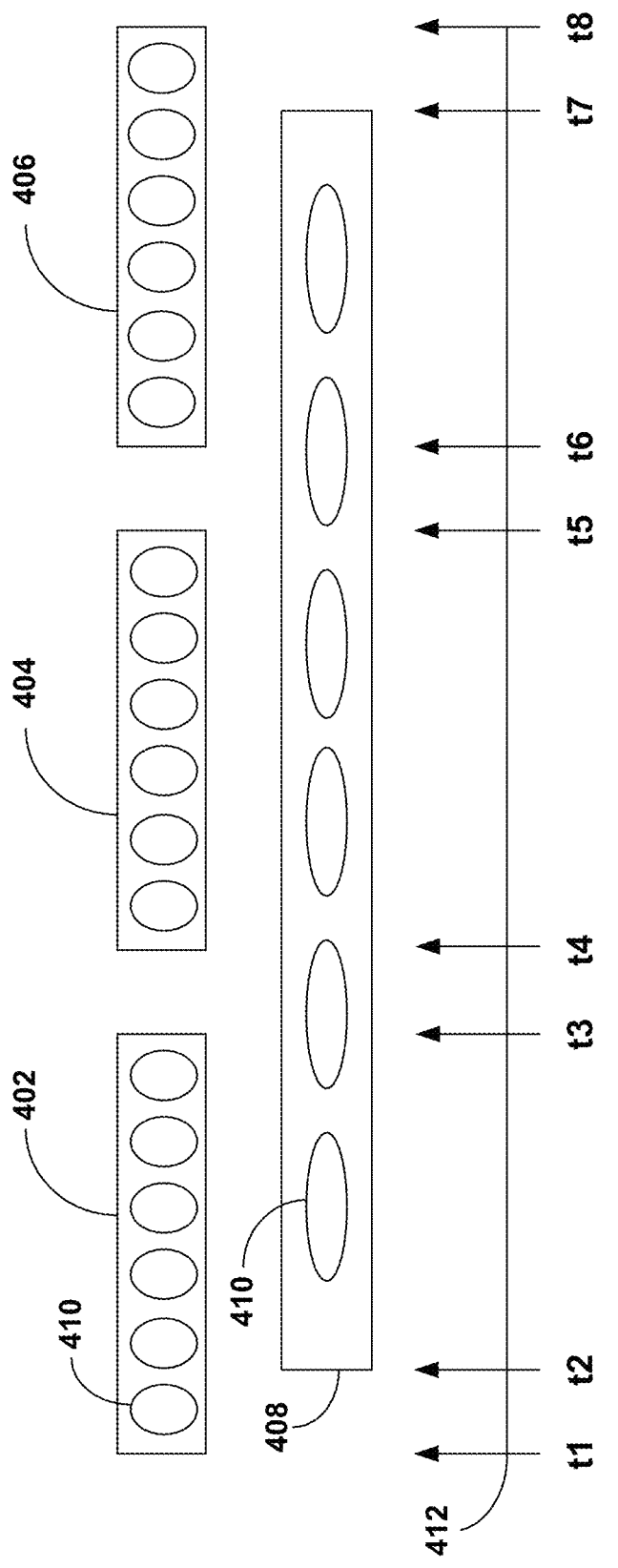
FIG. 4 is an example diagram showing a conceptual illustration of data output by sensors of a vehicle over a time period.

FIG. 4 is an example diagram showing a conceptual illustration of data output by sensors of a vehicle over a time period. The example diagram shows multiple sensor data frames 402-408 that each include various sensor measurements 410 received by a computing device from multiple sensors. An example computing device may receive the sensor data frames at the different times illustrated by the example timeline 412, which shows possible durations of the sensor data frames 402-408.

As such, the computing device may first receive sensor data frame 402 from a sensor of the vehicle at time (t1). In general, the computing device may receive the sensor data frame 402 as well as sensor data frames 404-406 at a first frame rate (e.g., low latency level) from a sensor. Since the computing device is shown receiving multiple frames of sensor data 402-406 from a sensor during the duration of time that it is receiving the sensor data frame 408 at a second frame rate (e.g., high latency level) from another sensor. In other examples, the computing device may receive sensor data frames at other latencies or different frames rates and receive other sensor data frames from additional sensors of the vehicle as well.

While the computing device receives the first sensor frame 402 from the set of sensor frames 402-406 from one particular sensor, the computing device may also start receiving frames of sensor data, such as sensor data frame 408, from other sensors as shown in the FIG. 4. In particular, the example diagram shows that while the computing device is receiving the sensor frame 402, it also starts receiving the sensor frame 408 at time (t2). As such, the computing device continues to receive the sensor frame 408 while completing the reception of the sensor frame 402 and during the reception of the subsequent sensor frame 404 at time (t4) until time (t5) as well as during the initial start of receiving the sensor frame 406 at time (t6). The example diagram further shows that the computing device completes the reception of the sensor data frame 408 at time (t7) and completes the reception of the third sensor data frame 406 of the set of frames received from the first sensor at time (t8).

During operation, the computing device may start processing a frame of sensor data when an initial portion of the frame is initially received or upon the reception of the entire frame. For example, the computing device may use the data analysis process previously discussed to analyze the sensor data frames 402-408 at the moment the frames are initially received from sensors. As such, the computing device may perform data analysis for the sensor data frame 402 from time (t1) to time (t3) and may perform data analysis for the sensor data frame 408 of the second set starting at time (t2) as the computing device receives the sensor data frame 408 at the slower frame rate shown in the timeline 412. The computing device may perform data analysis for the entire individual sensor data frames.

After completing data analysis for a frame or a portion of the frame, the computing device may add the results of the data analysis to any pending measurements associated with objects in the environment. In some instances, a buffer may be used. As a result, at time (t3), the computing device may determine a feature state indicative of the environment, which may include estimating parameters of objects in the environment using data extracted from the first sensor data frame 402 and a portion of the sensor data frame 408 that overlaps up to time (t3), such as the first portion of the sensor data frame 408 from time (t2) to time (t3). In some instances, the computing device may also estimate possible trajectories for one or multiple objects in the environment based on the measurements captured within the processed sensor data frames.

In a similar manner, the computing device may update information within the feature state including object parameters and/or object trajectories based on subsequent frames or portions of the sensor data frames. In some instances, the computing device may add information indicative of new objects based on newly received sensor data. For example, the computing device may use measurements in the subsequent frame of sensor data 404 received at the low latency frame rate and a subsequent portion of the sensor data frame 408 that corresponds to at least the duration of the subsequent sensor data frame 404. As such, the computing device may use the sensor measurements in the sensor data frame 408 from time (t3) to time (t5) as well as the sensor measurements in the sensor data frame 404 from time (t4) to time (t5) to update feature state, including object detection information (e.g., parameters and trajectories) at time (t5).

Similarly, the computing device may repeat this process to use measurements provided within sensor data frame 406 and measurements from a portion of the sensor data frame 408 that corresponds to the duration of the sensor data frame 406 to update the parameters and estimated trajectories associated with objects in the environment. For example, the computing device may use information provided in the sensor data frame 406 from time (t6) to time (t7) or time (t8) as well as the remaining portion of the sensor data frame 408 from time (t5) to time (t7) to update the parameters at either time (t7) or time (t8) depending on how much of sensor data frame 406 was processed and used by the computing device. The computing device may repeat the process for all received frames for all or a set of sensors, which may include using the measurement buffer periodically. For example, the computing device may continue to receive and process new frames of sensor data as the vehicle or robotic device navigates a path of travel.

In some instances, the computing device may perform data analysis for the first full frame for each sensor, which may be stored within a buffer. The computing device may then add the data analysis results to a pending measurement buffer or within memory. Additionally, the computing device may update the parameters and other information related to objects in the environment to the end of the frame end times. The computing device may repeat until all frames are processed using data association and estimated trajectories may be updated. The computing device may add or subtract trajectories based on newly received and processed measurements provided within frames of sensor data acquired by sensors.

Figure 5:
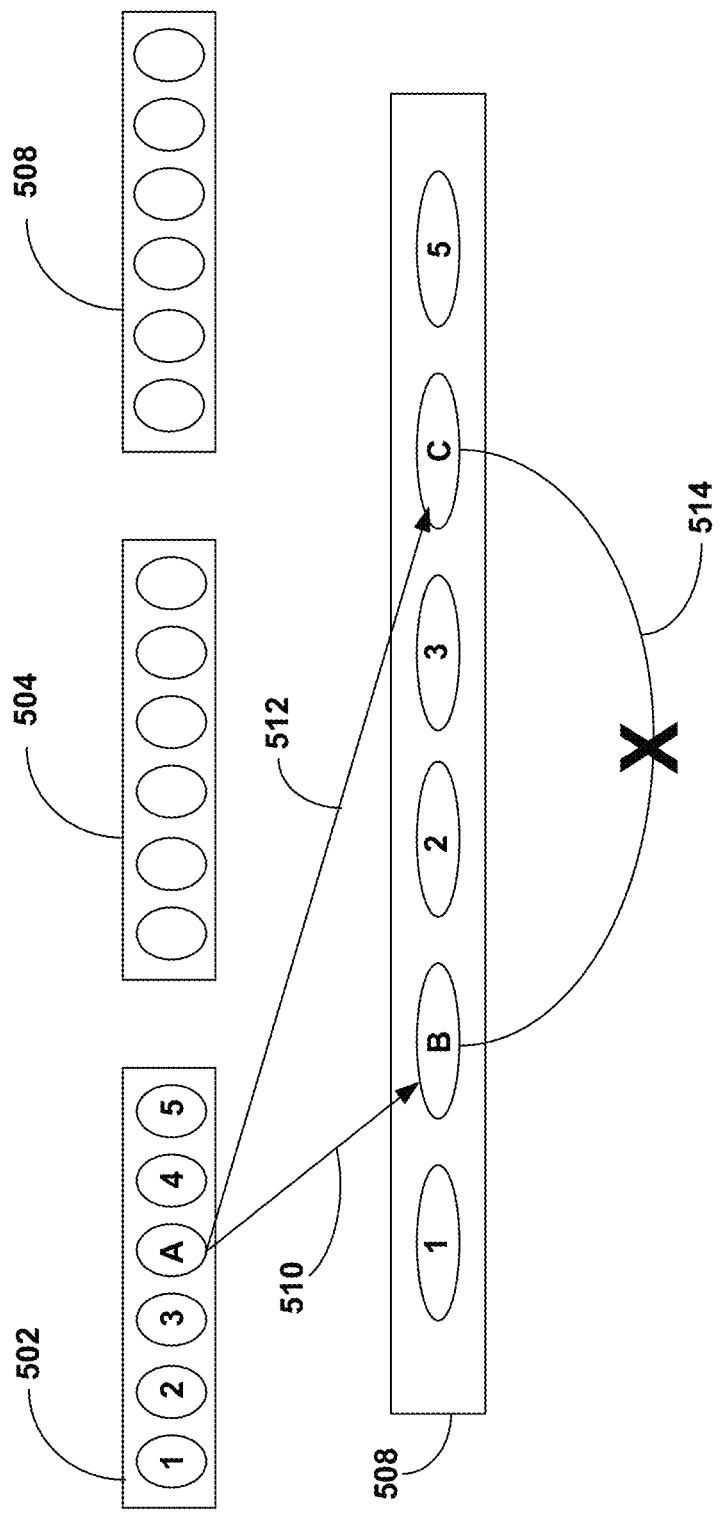
FIG. 5 is another example diagram showing a conceptual illustration of data output by sensors of a vehicle over a time period.

FIG. 5 is another example diagram showing a conceptual illustration of data output by sensors of a vehicle over a time period. In some examples, the computing device may encounter some issues when different sensors require creation of new trajectories for one or multiple objects in the environment of the vehicle or robotic device. In such instances, the computing device may use logic to merge trajectories between sensors, but may avoid using data from a single sensor data frame when merging trajectories. FIG. 5 shows the results that the computing device may create after performing a GNN process with a first sensor data frame 502 of a first set of sensor data frames 502-506 received at a low latency level from a particular sensor and a first sensor data frame 508 of the second set received at a high latency level from a different sensor.

In the example diagram shown in FIG. 5, a number within the frames 502 denotes an example associated trajectory and a letter denotes a possibly new trajectory number for objects in the environment of the vehicle. As such, the computing device may determine that the sensor data frame 502 includes previously identified trajectory identification numbers {1, 2, 3, 4, and 5} as shown and a possible new trajectory {A}. The example diagram also shows sensor data frames 504-508 that may have not yet been processed by the computing device. For the information provided by the second sensor, the sensor data frame 508 includes trajectory identification numbers {1, 2 3, and 5} and new possible trajectories {B, C}.

While updating object detection information, the computing device may estimate new trajectories based on trajectories {A, B, and C}. However, the computing device may check to determine if estimated trajectory {A} can possibly be merged with estimated trajectory {B} or estimated trajectory {C} as shown by connections 510-512. Thus, the computing device may analyze whether the computing device can merge estimated trajectories, but may be configured to not merge estimated trajectories from the same single sensor data frame, such as estimated trajectory {B} and estimated trajectory {C} as shown by the false connection 514. Other examples of combining measurements within received sensor data frames may exist as well.

Figure 6:
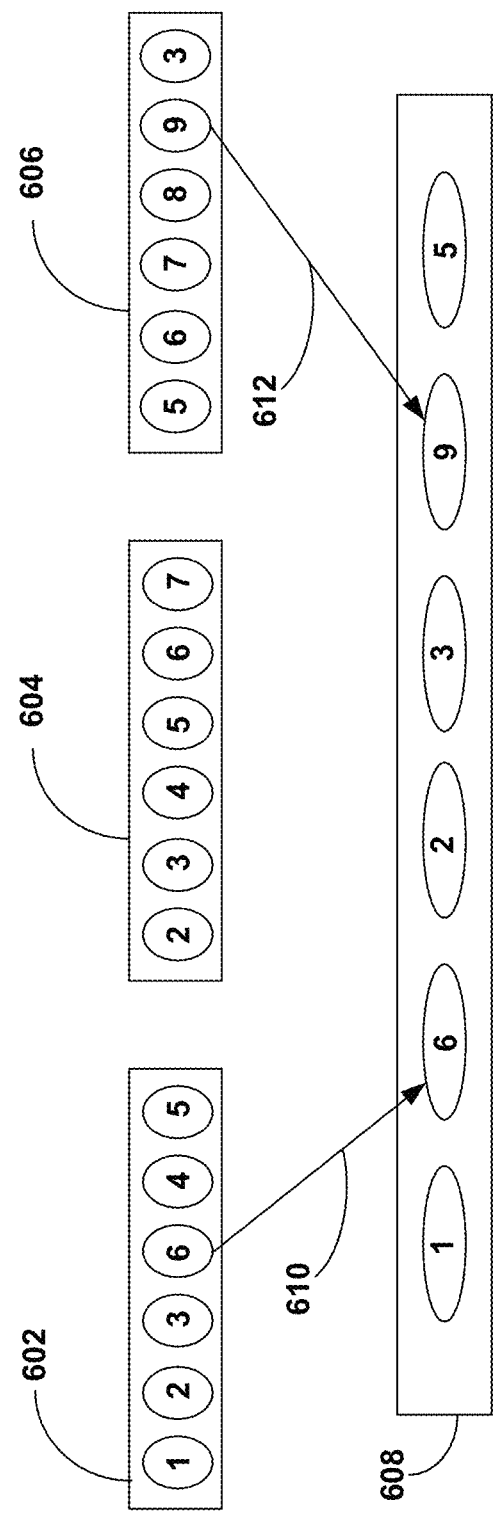
FIG. 6 is an additional example diagram showing a conceptual illustration of data output by sensors of a vehicle over a time period.

FIG. 6 is an additional example diagram showing a conceptual illustration of data output by sensors of a vehicle over a time period. Similar to FIG. 4 and FIG. 5, the example diagram shown in FIG. 6 illustrates a computing device (not shown) receiving a first set of sensor data frames 602-606 at a low latency rate from a sensor and a second set of sensor data frames (e.g., sensor data frame 608) at a high latency rate from a different sensor. In other examples, the computing device may receive additional sensor data frames from other sensors as well.

Within the example diagram, the computing device may use the rollback technique described herein to process measurements within the sensor data frames received at different rates. As such, the computing device may perform data association on the entire sensor data frame 602 and sensor data frame 608 prior to using the rollback technique. The computing device may use the roll back technique to directly add measurements from the first sensor data frame 602 of the first set to a pending measurement buffer and measurements from the sensor data frame 608 as they are received.

As a result, the computing device may update its feature state, including any estimated object trajectories based on the received measurements. This may enable the computing device to possible associate information, including estimated trajectories based on measurements in the sensor data frame 608 with some previously determined trajectories estimated from the sensor data frame 602 as shown by connections 610-612. The computing device may use the rollback technique to update its feature state indicative of the environment of the vehicle based on measurements that the computing device may receive at a slower rate in sensor frames received at a high latency from a sensor. As such, the computing device may estimate trajectories within the feature state before processing the latter sensor data frames 604-606 from the first sensor.

Figure 7:
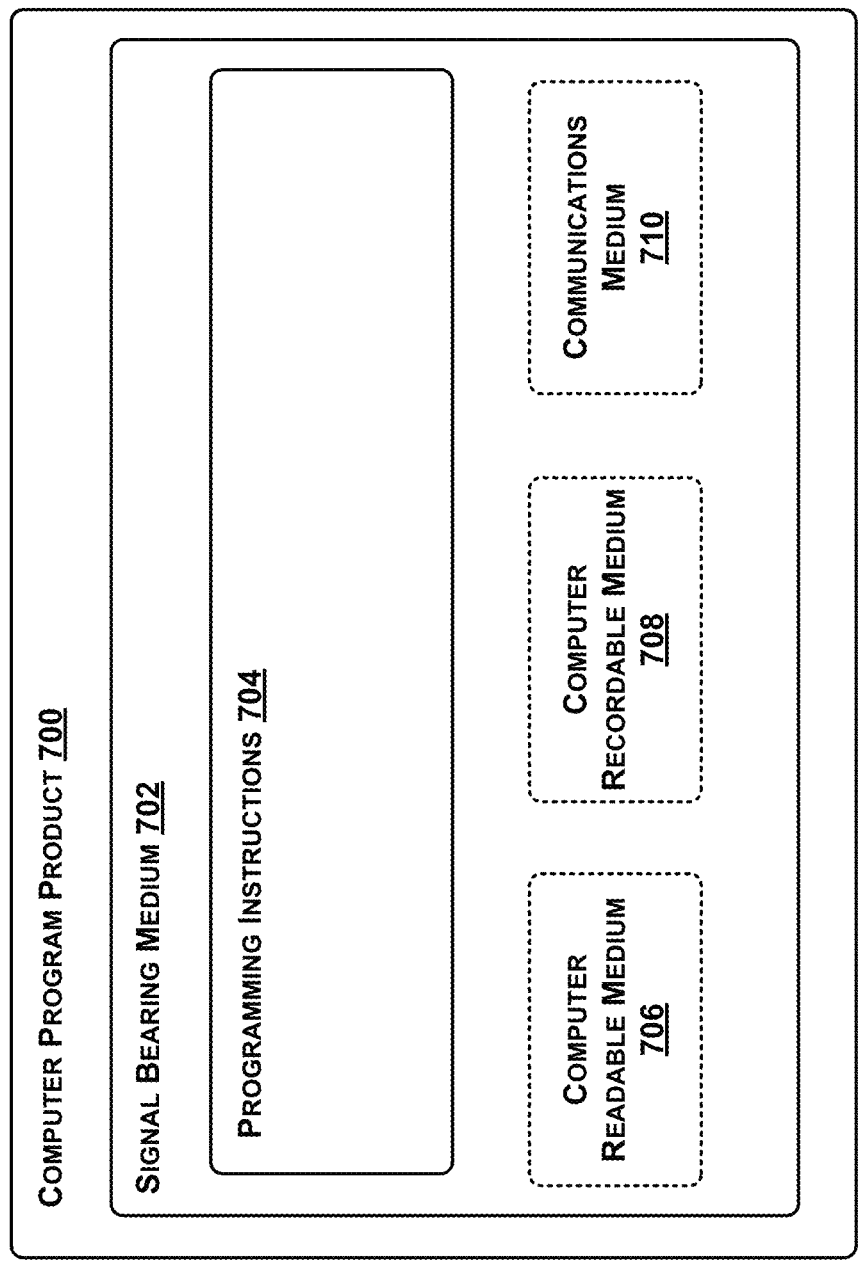
FIG. 7 is a schematic illustrating a conceptual partial view of an example computer program product that includes a computer program for executing a computer process on a computing device.

FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may encompass a computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the processor of FIG. 1 may be configured to provide various operations, functions, or actions in response to the programming instructions 704 conveyed to the processor by one or more of the computer readable medium 706, the computer recordable medium 708, and/or the communications medium 710.

The non-transitory computer readable medium could also be distributed among multiple data storage elements, which could be remotely located from each other. The computing device that executes some or all of the stored instructions could be a device. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
    receiving, at a computing system from a first sensor at a first rate, first sensor data corresponding to an environment of a vehicle;
    receiving, at the computing system from a second sensor at a second rate, second sensor data corresponding to the environment;
    determining, using probabilistic gating on a first data segment of the first sensor data and a portion of a first data segment of the second sensor data that correspond to the environment at a first time period, information indicative of parameters of one or more objects in the environment, wherein the probabilistic gating associates measurements within a given data segment of sensor data to respective objects in the environment;
    modifying, using probabilistic gating on a second data segment of the first sensor data and a subsequent portion of the first data segment of the second sensor data that correspond to the environment at a second time period, the information indicative of the parameters of the one or more objects; and
    providing, by the computing system, the modified information indicative of the parameters of the one or more objects to one or more systems of the vehicle.

2. The method of claim 1, wherein the first sensor is LIDAR and the second sensor is a camera system.

3. The method of claim 1, wherein the computing system completes receiving the first data segment of the first sensor data prior to completely receiving the first data segment of the second sensor data.

4. The method of claim 1, wherein providing the modified information indicative of the parameters of the one or more objects to one or more systems of the vehicle includes providing obstacle avoidance instructions.

5. The method of claim 1, wherein the second rate is less than the first rate.

6. The method of claim 1, wherein determining information indicative of the parameters of the one or more objects in the environment comprises:
    estimating a position and size of respective objects of the one or more objects in the environment.

7. The method of claim 1, wherein modifying the information indicative of the parameters of the one or more objects comprises:
    estimating a change in a velocity and an acceleration of respective objects of the one or more objects in the environment.

8. The method of claim 1, wherein determining information indicative of the parameters of the one or more objects in the environment comprises:
    estimating one or more trajectories of respective objects of the one or more objects, wherein the one or more trajectories are indicative of position patterns of the respective objects based on a near-term time period.

9. The method of claim 8, wherein modifying the information indicative of the parameters of the one or more objects comprises:
    adjusting the one or more trajectories of respective objects based on one or more changes in the information corresponding to the one or more objects.

10. The method of claim 1, further comprising:
    based on the modified information indicative of the parameters of the one or more objects, providing one or more conceptual gates that substantially outline respective objects of the one or more objects in the environment to the one or more systems of the vehicle.

11. A system comprising:
    at least one processor; and
    a memory having stored thereon instructions that, upon execution by the at least one processor, cause the system to perform functions comprising:
        receiving, from a first sensor at a first rate, first sensor data corresponding to an environment of a vehicle;
        receiving, from a second sensor at a second rate, second sensor data corresponding to the environment;
        determining, using probabilistic gating on a first data segment of the first sensor data and a portion of a first data segment of the second sensor data that correspond to the environment at a first time period, information indicative of parameters of one or more objects in the environment, wherein the probabilistic gating associates measurements within a given data segment of sensor data to respective objects in the environment;
        modifying, using probabilistic gating on a second data segment of the first sensor data and a subsequent portion of the first data segment of the second sensor data that correspond to the environment at a second time period, the information indicative of the parameters of the one or more objects; and
        providing the modified information indicative of the parameters of the one or more objects to one or more systems of the vehicle.

12. The system of claim 11, wherein receiving, from the first sensor at the first rate, first sensor data corresponding to the environment of a vehicle comprises:
    receiving respective data segments of the first sensor data from the first sensor at a first latency level; and
    wherein receiving, from the second sensor at the second rate, sensor data corresponding to the environment comprises:
    receiving respective data segments of second sensor data from the second sensor at a second latency level, wherein the second latency level is a threshold higher than the first latency level.

13. The system of claim 11, wherein determining, using the first data segment of the first sensor data and the portion of the first data segment of the second sensor data that correspond to the environment at the first time period, information indicative of parameters of one or more objects in the environment comprises:
    estimating one or more trajectories of respective objects in the one or more objects responsive to receiving the first data segment of the first sensor data from the first sensor, wherein the one or more trajectories are indicative of near-term position patterns of the respective objects; and adjusting the one or more trajectories of the respective objects in the one or more objects responsive to receiving the portion of the first data segment of the second sensor data from the second sensor.

14. The system of claim 13, wherein providing the modified information indicative of the parameters of the one or more objects to one or more systems of the vehicle includes providing the one or more adjusted trajectories of the respective objects in the one or more objects to the one or more systems of the vehicle.

15. The system of claim 11, wherein determining, using the first data segment of the first sensor data and the portion of the first data segment of the second sensor data that correspond to the environment at the first time period, information indicative of the parameters of one or more objects in the environment comprises:

using a Global Nearest Neighbor (GNN) process to select the portion of the first data segment of the second sensor data that corresponds to the environment at a same time of the first data segment of the first sensor data.

16. A non-transitory computer readable medium having stored therein instructions, that when executed by a computing device, cause the computing device to perform functions comprising:

receiving, from a first sensor at a first rate, first sensor data corresponding to an environment of a vehicle;

receiving, from a second sensor at a second rate, second sensor data corresponding to the environment;

determining, using probabilistic gating on a first data segment of the first sensor data and a portion of a first data segment of the second sensor data that correspond to the environment at a first time period, information indicative of parameters of one or more objects in the environment, wherein the probabilistic gating associates measurements within a given data segment of sensor data to respective objects in the environment;

modifying, using probabilistic dating on a second data segment of the first sensor data and a subsequent portion of the first data segment of the second sensor data that correspond to the environment at a second time period, the information indicative of the parameters of the one or more objects; and providing the modified information indicative of the parameters of the one or more objects to one or more systems of the vehicle.

17. The non-transitory computer readable medium of claim 16, further comprising:

based on the modified information indicative of the parameters of the one or more objects, providing one or more conceptual gates that substantially outline respective objects of the one or more objects in the environment to the one or more systems of the vehicle.

18. The non-transitory computer readable medium of claim 16, further comprising:

receiving, from a third sensor at a third rate, third sensor data corresponding to the environment; and wherein determining information indicative of parameters of one or more objects in the environment further comprises using at least a portion of a first data segment of the third sensor data.

* * * * *